Oct. 12, 1937.  B. E. O'HAGAN  2,095,674

REGULATOR DEVICE USING COPPER OXIDE RECTIFIERS

Original Filed Oct. 14, 1930

INVENTOR
Bernard E. O'Hagan.
BY
HIS ATTORNEY

Patented Oct. 12, 1937

2,095,674

UNITED STATES PATENT OFFICE 2,095,674

REGULATING DEVICE USING COPPER OXIDE RECTIFIERS

Bernard E. O'Hagan, Swissvale, Pa., assignor to The Union Switch & Signal Company, Swissvale, Pa., a corporation of Pennsylvania Original application October 14, 1930, Serial No. 488,574. Divided and application March 31, 1933, Serial No. 663,759. Divided and application November 19, 1935, Serial No. 50,553. Again divided and this application January 14, 1937, Serial No. 120,585

6 Claims. (Cl. 171—229)

My invention relates to regulating devices using copper oxide rectifiers.

One object of my invention is the provision of novel and improved means for regulating the output voltage of a generator.

I will describe one form of apparatus embodying my invention, and will then point out the novel features thereof in claims.

Figure 1:
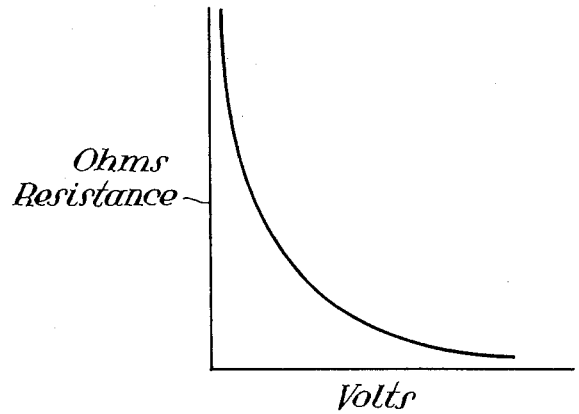
Figure 2:
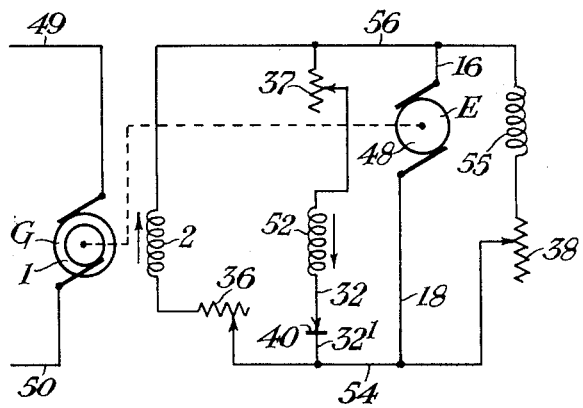

In the accompanying drawing, Fig. 1 is a curve showing certain electrical characteristics of a copper oxide rectifier. Fig. 2 is a view showing one form of apparatus embodying my invention.

The present application is a division of my application Serial No. 50,553, filed November 19, 1935, for Regulating devices using copper oxide rectifiers, which latter case is a division of my application Serial No. 663,759, filed March 31, 1933, for Regulating devices using copper oxide rectifiers, which last case is a division of my application Serial No. 488,574, filed October 14, 1930, for Regulating devices using copper oxide rectifiers, which has matured into Patent No. 1,966,558, issued July 17, 1934.

Referring first to Fig. 1, the curve shown in this view illustrates the voltage-resistance characteristic of the copper oxide rectifier described and claimed in United States Letters Patent No. 1,640,335, granted to L. O. Grondahl on August 23, 1927. This curve shows that as the voltage across the rectifier increases, the resistance in the low resistance direction decreases, and that the decrease of resistance is much more rapid at low voltages than at high voltages.

Referring to Fig. 2, this figure shows how the copper oxide rectifier may be applied to keep the terminal voltage of an alternating current generator constant when the generator field is energized by current from an exciter driven by the alternating current generator shaft. Generator G comprises an armature 1 and a field 2 which is controlled by variable resistance 36. Connected in parallel with the generator field 2 is a rectifier 40 and a differential field 52 which is controlled by variable resistance 37. The current generated by exciter E flows from wire 16, through wire 56, field 2, variable resistance 36, wire 54, and wire 18, and parallel with the field path through variable resistance 37, differential field 52, wire 32, rectifier 40, and wire 32¹. When the generator speed is increased, due to an increase of speed of the driving unit, the voltage across terminals 49 and 50 is increased and the speed of exciter E is increased, increasing the voltage across armature 48 and across rectifier 40. The resistance of rectifier 40 decreases causing an increase of current through differential field 52 which opposes field 2, and the field intensity of armature 1 is decreased. The voltage across terminals 49 and 50 therefore remains constant. By connecting rectifier 48 directly across field 2, the differential field 52 can be eliminated.

The main feature of my invention is that since a copper oxide rectifier has the electrical characteristic of lowering its resistance substantially and instantaneously when the voltage across it is increased by a relatively small amount, the rectifier may be used effectively as a regulating device in the manner described.

One advantage resulting from the use of the copper oxide rectifier in the manner described is that, because of the greater resistance change for a given voltage change obtainable with the rectifier as compared with the resistance change of the usual ballast lamp or negative temperature coefficient resistor, more sensitive and positive voltage regulation may be had. Another advantage is that since the copper oxide rectifier is practically instantaneous in its response to voltage changes, as contrasted with devices in which a resistance change follows upon a temperature change requiring an appreciable time interval, the generator voltage can be maintained within very close limits.

It will be apparent that my invention is not limited to the use of the copper oxide rectifier, as any other suitable resistor having a negative resistance-voltage coefficient and the property of changing its resistance instantaneously with voltage changes will provide the useful result to which my invention is directed.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, an electric generator comprising an armature and a separately excited field, a differential field connected in parallel with said separately excited field for producing flux to oppose the flux of said separately excited field, a copper oxide rectifier connected in series with said differential field and poled to conduct current in the direction in which current is supplied to the differential field, and an exciter having an armature and a shunt field for supplying current to energize said separately excited field and said differential field.

2. In combination, an electric generator comprising an armature and a separately excited field, a differential field connected in parallel with said separately excited field, a copper oxide rectifier connected in series with said differential field, and an exciter mechanically coupled with said generator for supplying current to energize said separately excited field and said differential field.

3. In combination, an electric generator comprising an armature and a separately excited field, a differential field connected in parallel with said separately excited field, a high negative resistance-voltage coefficient resistor characterized by instantaneous changes of resistance with voltage, said resistor being connected in series with said differential field, and an exciter mechanically coupled with said generator for supplying current to energize said separately excited field and said differential field.

4. In combination, an electric generator comprising an armature and a separately excited field, a differential field for producing flux to oppose the flux of said separately excited field, an exciter mechanically coupled with said generator for supplying current to energize said separately excited field and said differential field, and a copper oxide rectifier associated with said differential field and poled in such direction as to augment the increase of current flow through said differential field upon an increase in the voltage of said exciter, thereby aiding to regulate the output voltage of said generator.

5. In combination, an electric generator comprising an armature and a separately excited field, a differential field for said generator, an exciter having a fixed speed relation with said generator for supplying current to energize said separately excited field and said differential field, and a copper oxide rectifier associated with said differential field and poled in such direction as to magnify changes in current flow through said differential field caused by changes in the output voltage of said exciter.

6. In combination, an electric generator comprising an armature and a separately excited field, a differential field for said generator, an exciter having a fixed speed relation with said generator for supplying current to energize said separately excited field and said differential field, and a high negative resistance-voltage coefficient resistor characterized by instantaneous changes of resistance with voltage connected in series with said differential field for disproportionately increasing the current flow through said differential field upon an increase in the voltage of said exciter, thereby aiding to regulate the output voltage of said generator.

BERNARD E. O'HAGAN.